United States Patent
Wang et al.

(10) Patent No.: US 8,015,522 B2
(45) Date of Patent: Sep. 6, 2011

(54) SYSTEM FOR IMPLEMENTING POST-SILICON IC DESIGN CHANGES

(75) Inventors: Hsin-Po Wang, Hsinchu (TW); Yu-Sheng Lu, Hsinchu (TW); Fong-Yuan Chang, Taichang (TW); Yi-Der Lin, Taipei (TW); Sung-Han Tsai, Taichung (TW); Ru Lin Yang, Hsinchu (TW); Chun-Cheng Chi, Tai Chung (TW); Hsueh Liang Hsu, Tao Yuan (TW)

(73) Assignee: Springsoft USA, Inc., San Jose, CA (US)

( * ) Notice: Subject to any disclaimer, the term of this patent is extended or adjusted under 35 U.S.C. 154(b) by 312 days.

(21) Appl. No.: 12/345,399

(22) Filed: Dec. 29, 2008

(65) Prior Publication Data

US 2009/0178013 A1    Jul. 9, 2009

Related U.S. Application Data

(60) Provisional application No. 61/018,941, filed on Jan. 4, 2008.

(51) Int. Cl.
*G06F 9/455* (2006.01)
*G06F 17/50* (2006.01)

(52) U.S. Cl. ........ 716/107; 716/126; 716/132; 716/134; 716/139

(58) Field of Classification Search ............. 716/104, 716/107, 126

See application file for complete search history.

(56) References Cited

U.S. PATENT DOCUMENTS

| | | | |
|---|---|---|---|
| 5,867,396 A | 2/1999 | Parlour | |
| 5,953,236 A | 9/1999 | Hossain | |
| 6,014,506 A | 1/2000 | Hossain | |
| 6,093,214 A | 7/2000 | Dillon | |
| 6,255,845 B1 * | 7/2001 | Wong et al. | 326/38 |
| 6,262,665 B1 | 8/2001 | Johnson | |
| 6,378,114 B1 | 4/2002 | Shenoy | |
| 6,453,454 B1 | 9/2002 | Lee | |
| 6,530,073 B2 | 3/2003 | Morgan | |
| 6,581,199 B2 | 7/2003 | Tanaka | |
| 6,651,239 B1 | 11/2003 | Nikitin | |
| 6,748,579 B2 * | 6/2004 | Dillon et al. | 430/5 |
| 6,898,770 B2 | 5/2005 | Boluki | |
| 6,922,817 B2 * | 7/2005 | Bradfield et al. | 716/113 |
| 7,007,248 B2 | 2/2006 | Blinne | |
| 7,111,269 B2 | 9/2006 | Satapathy | |
| 7,644,382 B2 * | 1/2010 | Budumuru | 716/106 |

(Continued)

OTHER PUBLICATIONS

Kuo, Yu-Min; Chang, Ya-Ting; Chang, Shih-Chieh; Marek-Sadowska, Malgorzata; "Engineering Change Using Spare Cells with Constant Insertion," Nov. 4, 2007, ICCAD '07.*

(Continued)

*Primary Examiner* — Vuthe Siek
*Assistant Examiner* — Eric Lee
(74) *Attorney, Agent, or Firm* — Chernoff, Vilhauer, McClung & Stenzel

(57) ABSTRACT

An engineering change order (ECO) modifying an IC having spare cell instances is implemented by converting active cell instances implementing portions of the IC to be deleted into additional spare cell instances, by creating a technology independent behavioral model of portions of the IC to be added, by selecting spare cell instances to implement the behavior model, and by routing nets to the selected spare cell instances in a way that minimizes a number of metal layers of the IC that are modified.

16 Claims, 12 Drawing Sheets

U.S. PATENT DOCUMENTS

2007/0124712 A1    5/2007    Lu et al.

OTHER PUBLICATIONS

Chen, Yen-Pin; Fang, Jia-Wei; Chang, Yao-Wen; "ECO Timing Optimization Using Spare Cells and Technology Remapping," Nov. 7, 2007, IEEE.*

Yen-Pin Chen et al., ECO Timing Optimization Using Spare Cells and Technology Remapping, Published Nov. 4, 2007.

Yu-Min Kuo et al., Engineering Change Using Spare Cells with Constant Insertion, IEEE/ACM International Conference on Computer-Aided Design, 2007, published Nov. 7, 2007, p. 544.

* cited by examiner

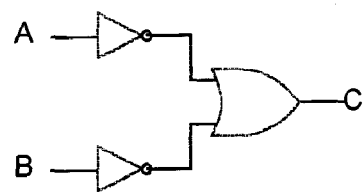
FIG. 6
$C = \overline{A} + \overline{B}$
FIG. 5
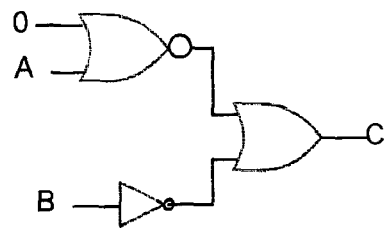
FIG. 8
FIG. 7
| A | B | C | VALIDITY |
|---|---|---|---|
| 0 | 0 | 0 | I |
| 0 | 0 | 1 | V |
| 0 | 1 | 0 | I |
| 0 | 1 | 1 | V |
| 1 | 0 | 0 | I |
| 1 | 0 | 1 | V |
| 1 | 1 | 0 | V |
| 1 | 1 | 1 | I |
FIG. 9
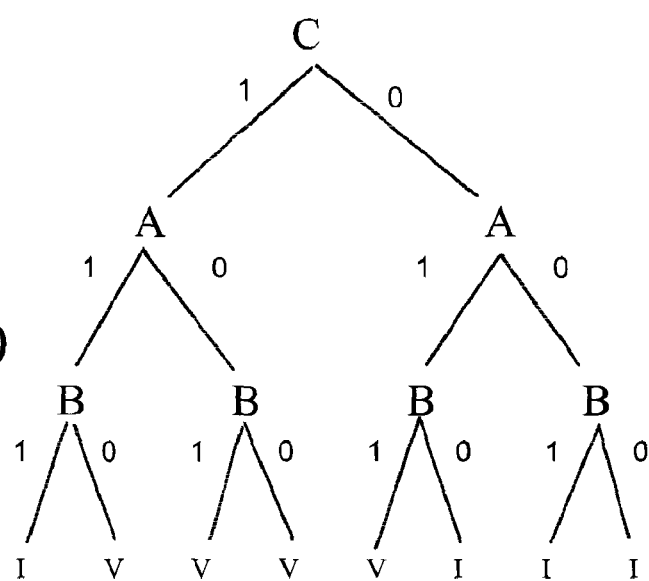
FIG. 10

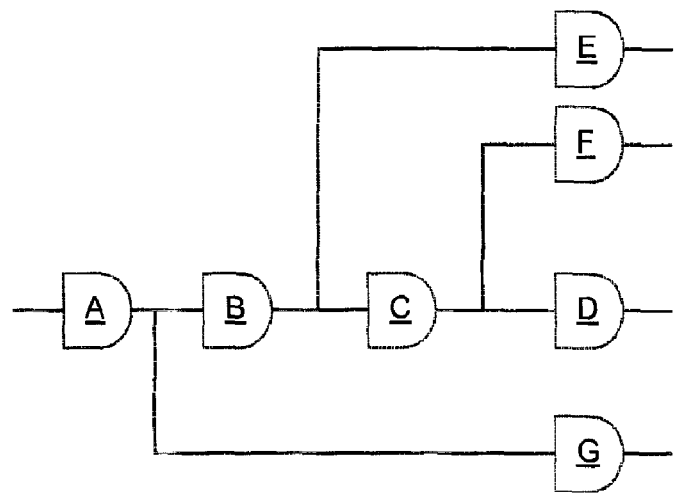
FIG. 20
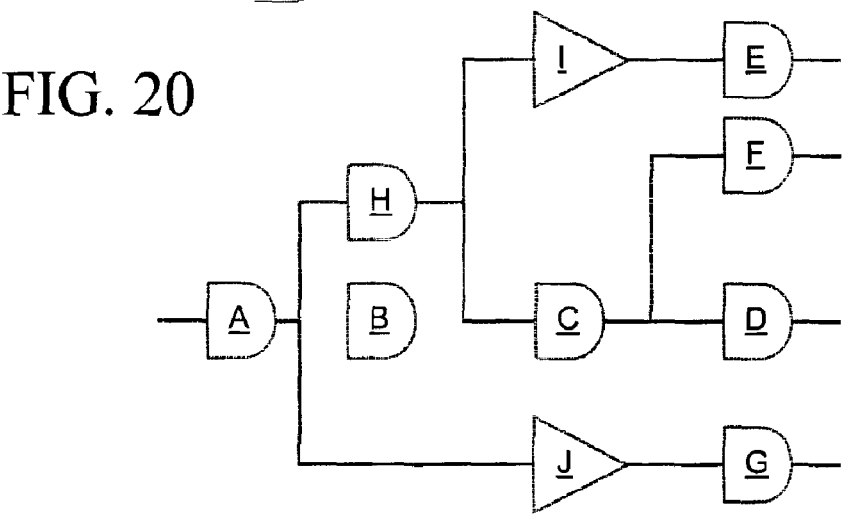
FIG. 21
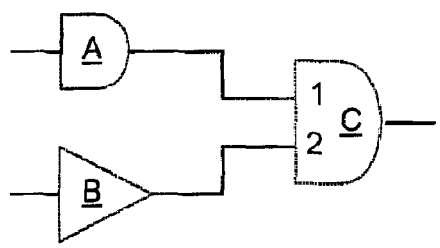          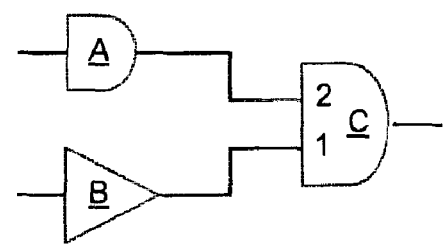
FIG. 22                      FIG. 23

US 8,015,522 B2

SYSTEM FOR IMPLEMENTING POST-SILICON IC DESIGN CHANGES

CROSS-REFERENCE TO RELATED APPLICATION

This application claims benefit of U.S. Provisional Application No. 61/018,941 filed Jan. 4, 2008, the entire disclosure of which is incorporated herein by reference for all purposes.

BACKGROUND OF THE INVENTION

1. Field of the Invention

The invention relates in general to computer-based systems for automatically implementing post-silicon engineering change orders (ECOs) by altering IC layout designs through ECO re-synthesis, optimization and routing.

2. Description of Related Art

Referring to FIG. 1, an IC designer typically generates an initial digital integrated circuit (IC) design in the form of a "register transfer level" (RTL) netlist 10 referencing the conductive networks ("nets") conveying signals to and from the IC's registers and other clocked devices and using hardware description language (HDL) statements to describe logical relationships between those signals. The designer then uses a computer-based synthesis tool 12 to automatically convert RTL netlist 10 into a "gate level" netlist 14 describing the IC as being formed by interconnected instances of standard cells having known internal layouts, such as logic gates, registers, memories, and other devices for implementing the logic described by the RTL netlist. The designer next employs a computer-based placement tool ("placer") 16 to convert the gate level netlist 14 into a "placed" netlist 18 indicating the orientation and position of each cell instance within the IC. Placed netlist 18 also references all of the nets that are to interconnect cell instances and indicates which cell instance terminals are connected to each net, but it does not indicate how the nets are to be routed within the IC. A computer-based routing tool ("router") 20 then converts placed netlist 18 into an IC layout 22, a data file indicating the internal layout, orientation and position of each cell instance and the layout of conductors forming the nets that are to interconnect terminals of those the cell instances. Layout 22 acts as a guide for IC fabrication.

A typical IC consists of many semiconductor, insulating and metallic layers, each formed during IC fabrication in a pattern determined by a separate photolithographic mask. An IC fabricator creates a separate mask for each of the semiconductor, insulating and metal layers based on IC layout 22. An IC's uppermost metallic layers normally form the conductive horizontal segments ("wires") of the nets that interconnect terminals of cell instances implemented in lower layers of the IC. Conductive vias, extending vertically through insulating layers between the metallic layers, interconnect wire segments formed on the various metallic layers.

After the fabricator produces prototype IC's in accordance with IC layout 22, the IC designer may decide to alter the IC design, for example to resolve timing, testability or yield problems discovered during testing of the prototype IC or to add new functions to a previously fabricated IC. To change the IC design, the designer could repeat the entire design process by generating a new RTL netlist 24, using a synthesis tool 26 to create a new gate level netlist 28, a placer 30 to create a new placed netlist 32, and a router 34 to produce a new IC Layout 36 for guiding fabrication of the revised IC. Since the process of converting new RTL netlist 24 into new IC Layout 36 is essentially automatic, it is possible that the mask for every layer of the IC based on new IC Layout 36 will differ from the mask for the corresponding layer of the IC based on old IC layout 22 even when the differences between RTL netlists 10 and 24 are small. Since masks are expensive, the need to redo the mask for every layer of the IC adds substantially to the expense of the re-design process.

The post-silicon engineering change order ("PSECO") system was developed to avoid having to redo the mask for every layer of an IC when only relatively small changes are needed to the original IC design following IC fabrication. During the initial design process, a variety of "spare" cell instances of various types are incorporated into gate level netlist 14 to fill space within the IC that would otherwise be unused. The spare cell instances are distributed throughout the IC and are "spare" in the sense that they not connected to any nets and therefore have no effect of IC behavior. Should a designer decide to modify IC logic in some way after masks for the IC have been fabricated, it may be possible to do so by changing only one or more of the metal layers forming the nets interconnecting cell instances so that the fabricator can reuse the existing masks for all other layers when fabricating the revised IC. For example, if a logic block within an IC initially included a small NOR gate and the designer determines after testing the prototype IC's that the NOR gate has insufficient driving power, the designer can modify the layout of the metal layers to reroute the nets to replace the small NOR gate with a larger, more powerful spare NOR gate. Similarly, a designer may be able to alter the logic implemented by a subcircuit within the IC without moving or changing any cell instances by re-routing nets to disconnect some active cell instances from the circuit and to incorporate spare cell instances into the circuit. Thus the change order affects only the masks for the metal layers implementing the nets Referring again to FIG. 1, to carry out a conventional PSECO operation, the designer generates a new RTL netlist 24 and then manually edits the original placed netlist 18 (step 38) thereby to produce an edited placed netlist 39 that revises the interconnections between cell instances to reflect the changes made to new RTL netlist 24. The changes to RTL netlist 24 involve appropriately interconnecting selected spare cell instances to existing cell instances and removing next interconnecting any existing cell instances that are no longer needed so that they now become spare cell instances. The designer then employs a conventional automated placement and routing tool (router) 40 operating in an "engineering change order" (ECO) mode to convert the edited placed netlist 39 to an ECO IC layout 42. In the ECO mode, router 40 is restricted to re-routing nets by modifying only the IC's metal layers. In some systems router 40, rather than the designer, will select the spare cell instances to be used. Since ECO layout 42 differs from the original IC layout 22 only with respect to the metal layers, the IC fabricator need create new masks only for the IC's metal layers. The ECO approach thus saves cost of re-fabricating masks for other IC layers.

Since the designer may erroneously change circuit logic when manually performing the netlist-editing step 38, the designer may also initiate the entire synthesis, placement and routing process (26, 30, 34) to produce a new IC layout 36. Since that process is not subject to logic errors, IC layout 36 will define an IC layout that will not have such errors. The designer can then employ a computer-based equivalence checker 44 to compare ECO IC layout 42 to new IC layout 36 to determine whether the ICs they describe are logically equivalent. If the ECO IC layout 42 is equivalent to IC layout 36, the designer will know ECO IC layout 42 has no logic errors and can be used as a guide for fabricating the masks for the metal layers of the revised IC.

Although the PSECO approach to modifying an IC design (also known as the "metal-only ECO" or "spare-cell instance-aware ECO" approach) saves money by allowing the fabricator to reuse masks for most layers, it does so at the cost of the engineering effort needed to manually edit the gate level netlist at step 38, a tedious, time-consuming and error-prone process. Since designers normally think of an IC design at the abstract level of the RTL netlist 10, designers find it hard to decipher and correctly modify a placed, gate level netlist 18 to change the logic it implements and to select the spare cell instances that are best positioned to enable router 40 to satisfy all routing, timing and other constraints. When router 40 fails to successfully generate a suitable ECO IC layout 42, the designer must re-edit netlist 39 to choose different spare cell instances and then allow router 40 again try to generate a suitable ECO IC layout 42. The edit/router steps 38 and 40 of the PESCO process may iterate several times in order to arrive at a suitable ECO IC layout 42, and may never converge to an acceptable layout solution. Since the PSECO approach is likely to fail when the scale of change is large, IC design companies typically use PSECO only for small-scale changes.

NTU paper "ICCAD 2007. 7C.1 ECO Timing Optimization Using Spare Cell instances and Technology Remapping" Yen-Bin Chen, Jia-Wei Fang, Yao-Wen Chang—National Taiwan Univ., Taipei, Taiwan (published Nov. 5, 2007), focuses on ECO optimization for fixing timing issues. Chen et al teach to solve timing issues based on spare cell instance locations by attempting to remap similar spare cell instances to different locations to improve timing. Chen et al teach to perform re-synthesis for any path that fails to meet the timing requirement. "Re-synthesis" refers to remapping cell instances on the timing path to different types of spare cell instances that yield the same Boolean function values but may improve the overall timing. Chen et al limit re-synthesis to a single path.

National Tsing Hua University paper. Y. M. Kuo, Y. T. Chang, S. C. Chang, and M. Marek-Sadowska, "Engineering Change Using Spare Cell instances with Constant Insertion" (published Nov. 11, 2007) focuses on PSECO re-synthesis with constant insertion by considering routing distances but not timing information when performing PSECO synthesis.

U.S. patent application Ser. No. 11/564,422, publication number 2007/0124712 A1, filed Nov. 29, 2006 teaches a method for fixing timing problems in an IC, but not within a post-silicon ECO environment.

SUMMARY OF THE INVENTION

The invention relates to computer-readable media containing software, which when read and executed by a computer, causes the computer to carry out a method for implementing an engineering change order (ECO) modifying a first integrated circuit (IC) layout for a first IC to produce a second IC layout for a second IC by modifying only net routing specified by the first IC layout. The first and second ICs include active cell instances interconnected by nets to form subcircuits, and include spare cell instances not interconnected by nets.

A computer carrying out the method In accordance with the invention, initially compares netlists describing the first and second ICs to identify additions and deletions. "Additions" are subcircuits of the IC formed by active cell instances and nets that are included in the second IC but not included in the first IC. Deletions are subcircuits formed by active cell instances and nets included in the first IC but not included in the second IC.

The computer then reclassifies active cell instances of the first IC that form the identified deletions as spare cell instances of the first IC;

The computer next performs "ECO resynthesis" by generating a technology independent model depicting circuit behavior of the identified additions and then selecting spare cell instances of the first IC to implement the depicted circuit behavior.

The computer then performs "ECO optimization" by further modifying the net routing specified by the first IC layout when helpful to improve the routeablity of the nets that must be added to the first IC layout to implement the depicted circuit behavior. ECO optimization may include, for example, selecting alternative spare cell instances to implement behavior of the technology independent model and rerouting nets.

The computer then modifies the net routing specified by the first IC layout to delete portions of nets routed to cell instances forming the deletions to convert them into spare cell instances, and to route nets to the selected spare cell instances of the first IC layout to form subcircuits implementing the circuit behavior depicted by the technology independent model.

In carrying out the ECO routing process, the computer will, if possible, refrain from altering any metal layers a user specifies as being "frozen" and will attempt to carry out the ECO process by automatically freezing additional metal layers, in order to determine a minimum number of metal layers that must be changed in order to implement the ECO.

The claims appended to this specification particularly point out and distinctly claim the subject matter of the invention. However those skilled in the art will best understand both the organization and method of operation of what the applicant(s) consider to be the best mode(s) of practicing the invention by reading the remaining portions of the specification in view of the accompanying drawing(s) wherein like reference characters refer to like element

BRIEF DESCRIPTION OF THE DRAWINGS

FIG. 5 is a Boolean logic equation representing relationships between three signals.

FIGS. 6-8 are schematic diagrams illustrating three different technology dependant implementations of the Boolean logic equation of FIG. 5.

FIGS. 9 and 10 are technology independent tabular representations of the Boolean logic of FIG. 5.

FIGS. 20-25 are schematic diagrams depicting circuits before and after optimization.

DETAILED DESCRIPTION OF THE INVENTION

The invention relates to a method for implementing a post-silicon engineering change order (PSECO) specifying changes to an integrated circuit (IC) layout design by modifying routing of nets between cell instances without affecting the layout of the cell instances themselves. The method is suitably implemented by a conventional computer executing software residing on computer-readable media such as, for example, a hard disk, a compact disk, USB drive, or read only or random access memory, which when read and executed by a conventional computer, causes the computer to carry out the method. Although there are many possible modes of practicing the invention defined by the claims appended to this specification, the following specification and drawings describe in detail only one best mode of practicing the invention. Those of skill in the art will appreciate that not all implementation details described below are necessary to practice the invention as recited in the claims.

Figure 1:
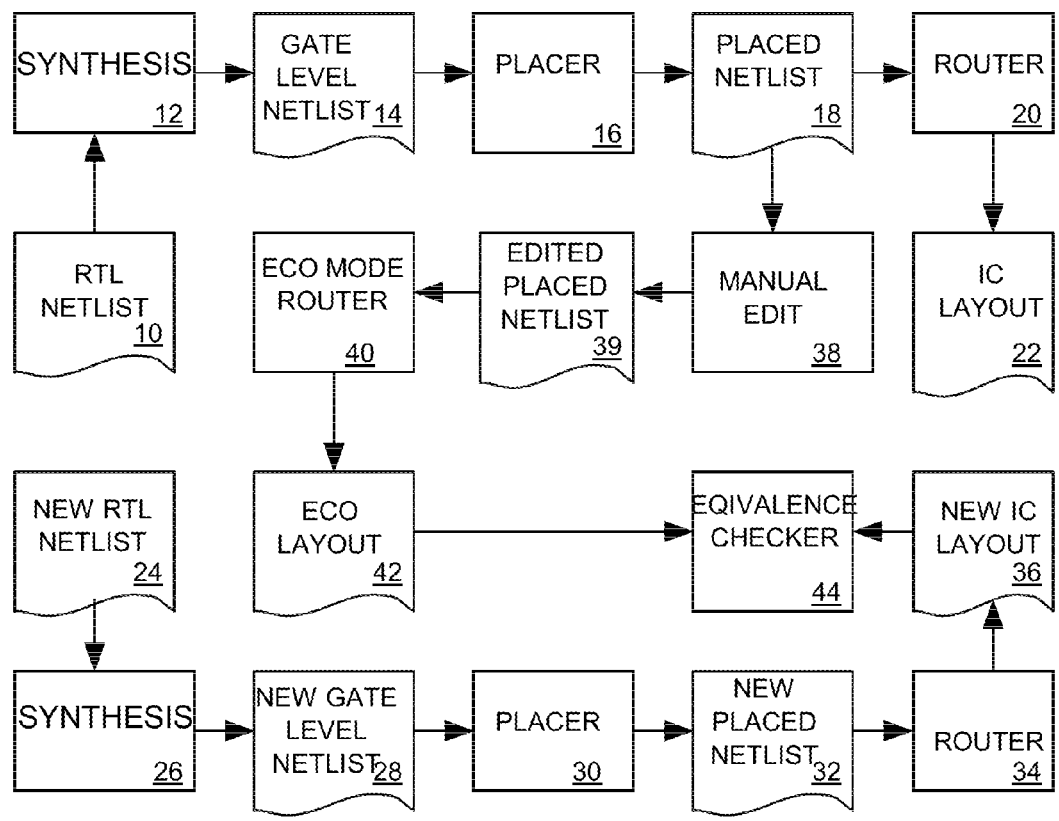
FIG. 1 is a process flow diagram depicting a prior art integrated circuit design and engineering change order process.
Figure 2:
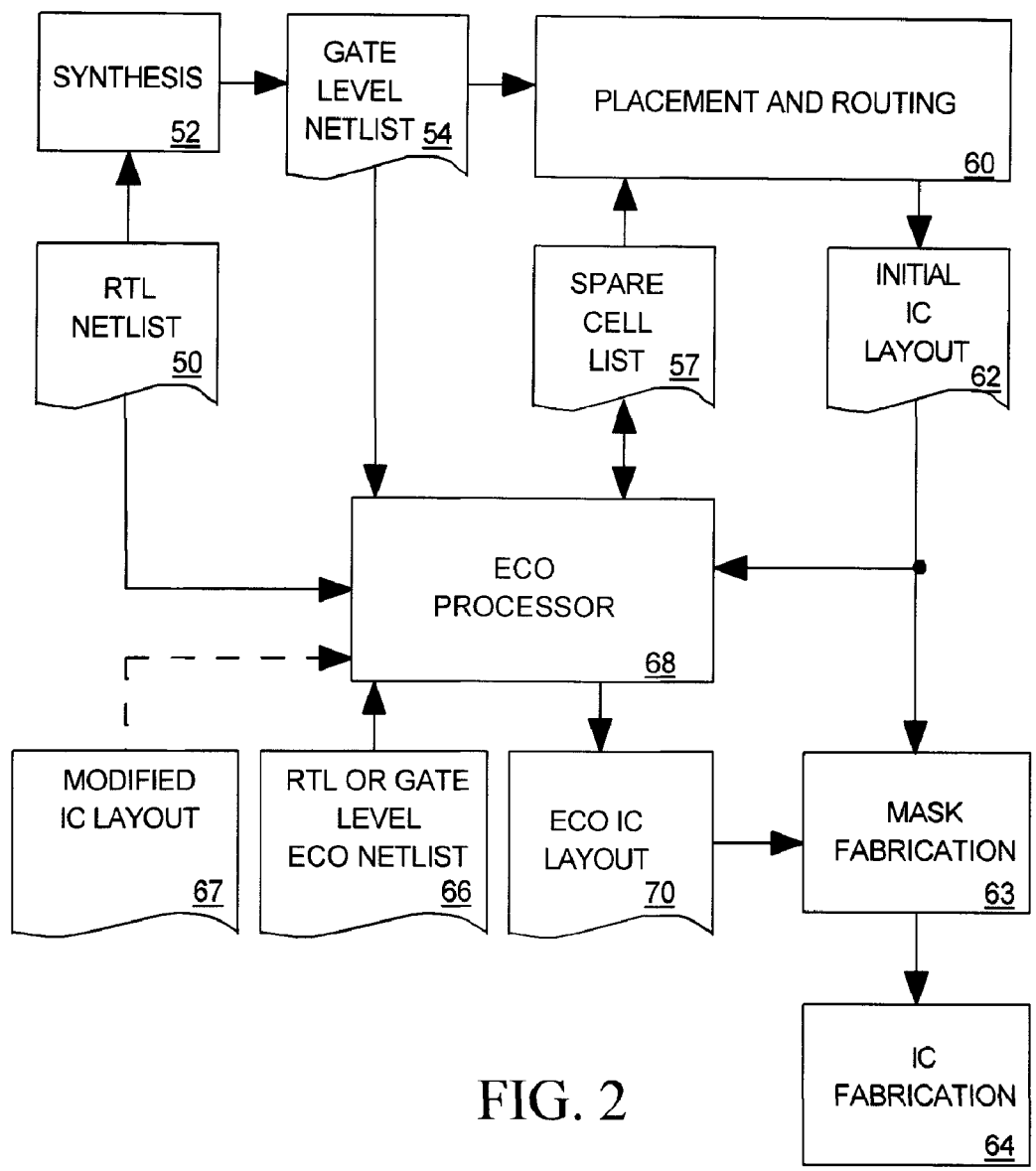
FIG. 2 is a process flow diagram depicting an IC design and engineering change order process in accordance with the invention.

FIG. 2 depicts a flow process for designing and fabricating an IC and for then modifying the IC design in response to a post-silicon engineering change order (PESCO). An IC designer creates an initial digital IC design in the form of a register transfer level (RTL) netlist 50 employing a high-level language to describe logical relationships between the IC's input, output and internal signals. The designer then uses a conventional synthesis tool 52 to automatically convert RTL netlist 50 into a gate level netlist 54 describing the IC as being formed by instances of standard cells interconnected by nets wherein a standard cell is an electronic device such as, for example, a transistor, a logic gate, a registers, or a memory, having a known internal layout and behavior. While gate level netlist 54 references all of the cell instances to be included in the IC and indicates which of their terminals are to be interconnected by nets, it does not indicate a position within the IC of each cell instance or the layout of the nets that are to interconnect the cell instances.

The designer then uses a conventional placement and routing (P&R) tool 60 to convert gate level netlist 54 into an IC layout 62, a data file indicating the internal layout, orientation and position of each cell instance and describing the layout of conductors forming the nets that are to interconnect terminals of the cell instances.

Each cell instance described by gate level netlist 54 is an "active" cell instance that affects the behavior of the IC by communicating with other cell instances and/or the input/output terminals of the IC via signals transmitted through nets. When creating IC layout 62, P&R tool 60 adds a variety of additional "spare" cell instances of various types described by a user-provided spare cell instance list 57 to fill space within the IC that would otherwise be unused. Since netlist 54 does not specify nets interconnecting any of the spare cell instances to any other cell instances or to any IC input/output terminals, the spare cell instances have no effect on IC behavior.

An IC typically consists of many layers of semiconductor, insulating and metallic material, each formed in a pattern determined by a separate photolithographic mask made by the IC fabricator in accordance with IC layout 62. The IC fabricator uses IC layout 62 as a guide during mask fabrication 63 to control the pattern of each layer of the IC during IC fabrication 64. After prototype ICs have been fabricated and tested, an IC designer may initiate an engineering change order (ECO) modifying the IC design by modifying RTL netlist 50 or gate level netlist 54 to produce a new RTL or gate level "ECO netlist" 66. An ECO processor 68 implementing the method in accordance with the invention automatically processes ECO netlist 66 and the original RTL netlist 50, gate level netlist 54 and IC layout 62 to produce an ECO IC layout 70 implementing the modified IC design.

An IC's upper metallic layers normally form horizontal segments of the conductive nets that interconnect terminals of active cell instances implemented in lower layers of the IC. Conductive vias, extending vertically through insulating layers between the metallic layers, interconnect wire segments formed on the various metallic layers to one another and to cell instance terminals. ECO processor 68 modifies the original IC layout 62 to produce the new ECO IC layout 70 by changing only the layout of one or more of the upper metal layers of the IC and vias that form the nets without adding, removing or repositioning any cell instances. As discussed below, ECO processor 68 will attempt to minimize the number of metal layers it modifies when implementing the change order and will, if possible, avoid altering any metal layer the user has specified as being "frozen".

Thus to fabricate the modified IC described by ECO IC layout 70, the IC fabricator need make new masks at step 63 only for the IC's upper metal layers and the insulating layers separating them and can reuse the expensive, existing masks for lower layers.

The ECO Process

Figure 3:
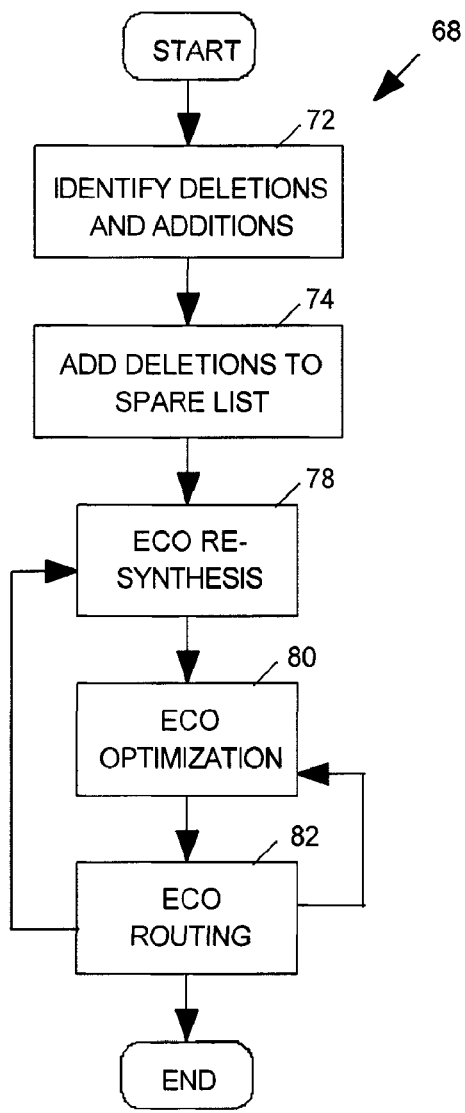
FIG. 3 is a process flow diagram depicting a process carried out by the engineering change order processor of FIG. 2.

FIG. 3 is a data flow diagram illustrating a method in accordance with the invention by a computer programmed to implement ECO processor 68 of FIG. 2. ECO processor 68 initially compares the ECO netlist 66 to RTL netlist 50 and/or gate level netlist 54 to determine the all additions and deletions (step 72). An "addition" is any subcircuit of the IC described by ECO netlist 66 not implemented by active cell instances in the IC described by gate level netlist 54, while a "deletion" is any subcircuit implemented by active cell instances in the IC described by gate level netlist 54 that is not described in ECO netlist 66. If the designer modified gate level netlist 54 to produce a gate level ECO netlist 66, ECO processor 68 compares ECO netlist 66 to the original gate level netlist 54 to determine which portions of the circuit described by gate level netlist 54 were deleted and which portions were added when producing ECO netlist 66. Alternatively, if the designer modified RTL netlist 50 to produce an RTL level ECO netlist 66, ECO processor 68 compares ECO netlist 66 to the original RTL netlist 50 to determine which statements have been added and deleted, and then maps the deleted statements to gate level netlist 54 to determine which active cell instances the designer deleted when producing ECO netlist 66. ECO processor 68 adds the active cell instances forming each identified deletion to spare instance list 57 (step 74) and then determines how to implement any added circuitry using the available spare cell instances.

ECO processor 68 then performs "ECO re-synthesis" (step 78) by selecting from the spare cell instance list, the spare cell instances to be made active in order to implement the change order. ECO processor 68 next performs "ECO optimization" (step 80) in wherein it modifies the spare cell choices made during ECO re-synthesis step 78 when necessary to reduce the likelihood of any timing or design rule violations. ECO processor 68 then performs "ECO routing" (step 82) by, in which modifies the original layout 36 to produce ECO layout 42 by disconnecting nets from the active cell instances that were made spare at step 74 and by routing new nets to the spare cell instances that are to be made active. The process ends after ECO routing step 82 if ECO processor 68 is able to successfully route the new nets. Otherwise, if it is unable to route the new nets without any routing conflicts and without any timing or design rule violations, ECO processor 68 returns to ECO optimization step 80 to alter the selection of spare cells used to implement the change order, and then tries again to route the new nets at step 82. ECO processor 68 will thus iterate through steps 80 and 82 until it finds a routable solution for the ECO. If no routable solution is found, ECO processor 68 may revert to ECO re-synthesis step 78 to alter the re-synthesis and then repeat steps 80 and 82.

ECO Re-synthesis

Figure 4:
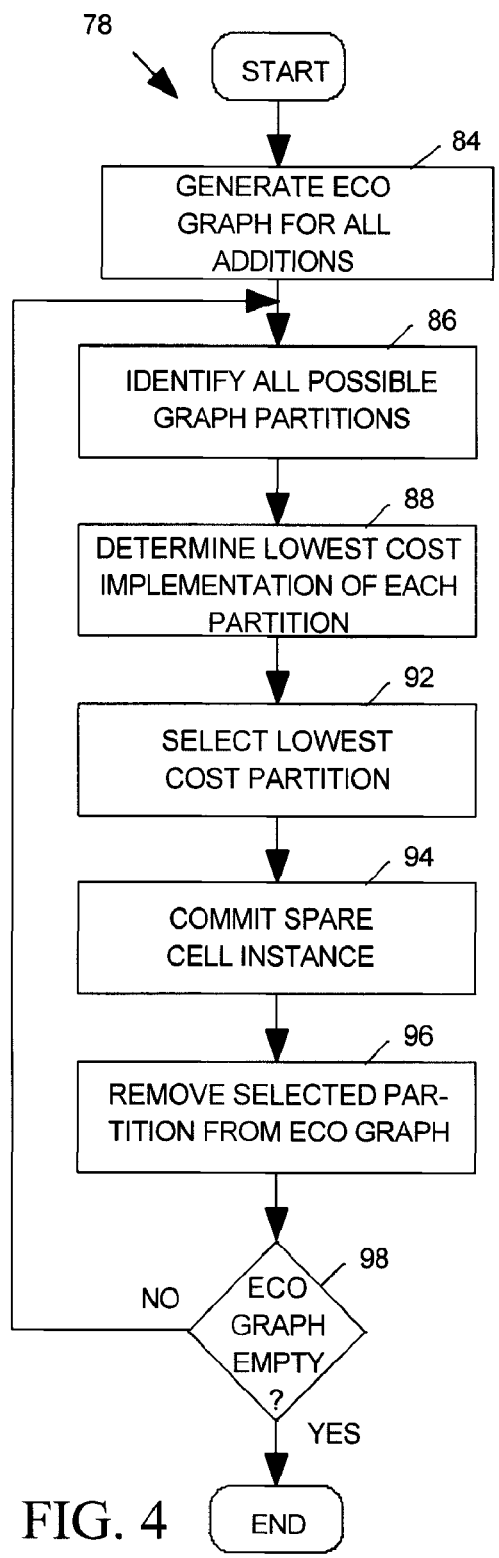
FIG. 4 is a process flow diagram depicting the ECO resynthesis step of FIG. 3 in more detail.

FIG. 4 details the ECO-resynthesis step 78 of FIG. 3, wherein ECO processor 68 selects the spare cell instances to be made active in order to implement the ECO.

In the context of an original IC design process, the term "synthesis" refers to a normally automated process of converting a high level RTL description of circuit behavior into a gate level netlist specifying the particular cell instances that are to implement that circuit behavior and indicating which terminals of those cell instances are to be interconnected by nets. Following syntheses, an IC designer will use placement and routing tools to process the gate level netlist to determine a position within the IC for each cell instance and to establish the route for each net that is to interconnect the cell instance terminals.

In prior art ECO processing systems, where the designer specifies the changes by manually editing a gate level netlist and specifying the particular spare cell instances that are to be made active, a prior art ECO processor need not perform automated synthesis because the input to the processor specifying the change is already in gate level from. The main tasks of the prior art ECO processor are to remove nets that are no longer needed and to route new nets to the spare cell instances that are to be made active, though some prior art ECO processors may also substitute one spare cell instance for another of a similar kind to eliminate routing or timing problems.

Although the ECO netlist 66 provided as input to ECO processor 68 of FIG. 2 may be in gate level form, it does not simply select spare cell instances to implement each new gate appearing in ECO netlist 66. Instead, an ECO processor 68 in accordance with the invention carries out "ECO re-synthesis" by first generating an "ECO graph" (step 84), a technology-independent description of the behavior of all of the additions in ECO netlist 66 identified at step 72. The ECO graph is "technology-independent" because it describes the behavior of the additions without implying any particular arrangement of gates or other cell instances implementing that behavior. After generating the ECO graph, ECO processor 68 selects a particular set of spare cell instances that, when suitably interconnected by nets, can implement the behavior described by the graph (steps 86-98).

The process of FIG. 4 is called "ECO-resynthesis" because ECO processor 68 selects the spare cell instances that are to implement the change order and ignores any implied selection of spare cell instances the designer may have incorporated into ECO netlist 66. If ECO netlist 66 is an RTL level netlist, it may specify an addition in the form of a new Boolean statement in the netlist, as shown for example in FIG. 5 indicating that a signal C is the logical OR of the logical inverses of signals A and B. Alternatively, if ECO netlist 66 is a gate level netlist, it could specify such an addition as a pair of inverter cell instances and an OR gate cell instance interconnected as illustrated in FIG. 6. Although the particular arrangement of gates of FIG. 6 implements the Boolean expression of FIG. 5, those of skill in the art will appreciate that there are many ways that a gate level ECO netlist 66 could specify an addition implementing the logic defined by the expression of FIG. 5. For example, FIGS. 7 and 8 show that the expression of FIG. 5 could be implemented as either a single NAND gate (FIG. 7) or combination a NOR gate, and OR gate and an inverter (FIG. 10).

Since ECO processor 68 must find a way to implement the behavior of all additions using only the available spare cell instances, the particular manner in which ECO netlist 66 describes the additions should not unnecessarily limit the arrangement of spare cell instances ECO processor 68 selects to implement their behavior. For example if ECO netlist 66 were to describe an addition as being the gate arrangement of FIG. 6, ECO processor 68 should be free to implement that addition using any of the circuit arrangements of FIG. 6-8 or any other arrangement of spare cell instances that can provide the same logical relationships between signals A, B and C depending on the types and positions of available spare cell instances within the IC layout.

The circuit representations provided by the Boolean expression of FIG. 5 and the gate level configurations of FIGS. 6-8 are "technology dependant" because they specify or imply a particular gate arrangement or a particular set of logical operations. The logical behavior of the circuits they represent can be expressed in a technology-independent manner, however, by the validity table of FIG. 9, showing which combinations of states of signals A, B and C are valid (V) and which are invalid (I). In this table a "1" indicates the signal is true and a "0" indicates the signal is false. The table indicates, for example, that the combination {A, B, C}={0, 0, 0} is an invalid condition for an circuit exhibiting the specified behavior whereas the combination {A, B, C}={0.0,1} is a valid condition for the circuit. Note that, unlike the circuit representations of FIGS. 5-8, the table of FIG. 9 describes circuit behavior only in terms of the validity of relationships between input signals A and B and output signal C without any inference as to the nature of the cell instances or logical operations that might implement that circuit behavior. FIG. 9 is therefore a "technology-independent" representation of a circuit because it specifies circuit behavior without implying any particular circuit implementation or logical operation.

Conventional synthesizers often employ tree-like or graph-like technology-independent representations of circuit behavior such as well-known binary decision (BDD) trees, AND-inverter (AIG) trees, sum-of-product (SOP) trees and AND-OR trees because they offer various digital computational advantages. For example, FIG. 10 shows a binary decision tree representation of the circuit behavior represented by the table of FIG. 9. A computer can determine the validity of any combination of signal states by traversing the tree. For example given the combination of states {A, B, C}={1, 0, 1}, the computer traverses the tree staring at the root C, following the path C=1, A=0, and B=1 to arrive at the conclusion that the combination of states is valid. Note that the binary decision tree is a technology-independent representation of circuit behavior because it describes circuit behavior in terms of the relationships between input signals A and B and output signal C without any inference as to the nature of the cell instances that might implement that circuit behavior. Any such technology-independent representation of the additions can be employed in the present invention. Herein we refer to any technology-independent representation as an "ECO graph".

We refer to each part of the ECO graph generated at step 84 that can be implemented by an available spare cell instance as a "partition". Having generated the ECO graph at step 94, ECO processor 68 suitably partitions the ECO graph and selects a spare cell instance to implement the behavior described by each partition. ECO processor 68 can partition ECO among cell instances in many different ways, but since it will subsequently have to route nets to the selected spare cell instances at ECO routing step 82 of FIG. 3 and will have to resolve timing and design rule violations during ECO optimization step 80, it tries to find the best way to partition the ECO graph with respect to its ability to subsequently route nets between the spare cell instances and minimize the likelihood of timing and design rule violations.

Referring again to FIG. 4, after generating the ECO graph at step 84, ECO processor 68 identifies every partition of the ECO graph that can be implemented by a spare cell instance (step 86) and, for each identified partition, ECO processor 68 identifies the particular cell instance that can implement the partition at the lowest cost (step 88). ECO processor 68 determines a "cost" of selecting any particular spare cell instance to implement a partition by evaluating a cost function that is a measure of the routability of nets to be connected to that particular spare cell instance. For example, the cost function may be a weighted sum of the number of design rule violations, routing conflicts, and timing violations that would have to be resolved later when a detailed route is established for each net if that particular spare cell instance were to implement that particular partition. The weighted sum may also include a term that increases in proportion to the number of frozen layers that must be modified in order to route nets to the selected spare cell instance. For example, if a particular partition can be implemented by an OR gate, and there are several OR gate spare cell instances in the IC, then ECO processor 68 selects the particular OR gate spare cell instance that yields the lowest cost function value. Step 88 is further detailed below.

After having determined every possible partition of the ECO graph at step 86 that can be implemented by a spare cell instance, and having determined the lowest cost spare cell instance implementation of each identified partition, ECO processor 68 selects the particular partition that can be implemented by a spare cell instance at the lowest cost (step 92), and then commits that particular spare cell instance to implementing that particular partition and removes that spare cell instance from the spare cell instance list (step 94). ECO processor 68 also removes that particular partition from the ECO graph (step 96). If the ECO graph is not empty (step 98), ECO processor 68 repeats steps 86-96 to select a next partition of the ECO graph and a next spare cell instance to implement that partition. ECO processor 68 continues to loop through steps 86-96 until it has fully partitioned the ECO graph and selected spare cell instances to implement each partition. At this point, the ECO re-synthesis step 78 of FIG. 3 is complete, ECO processor 68 having selected all spare cell instances needed to implement the new portions of the IC.

Figure 11:
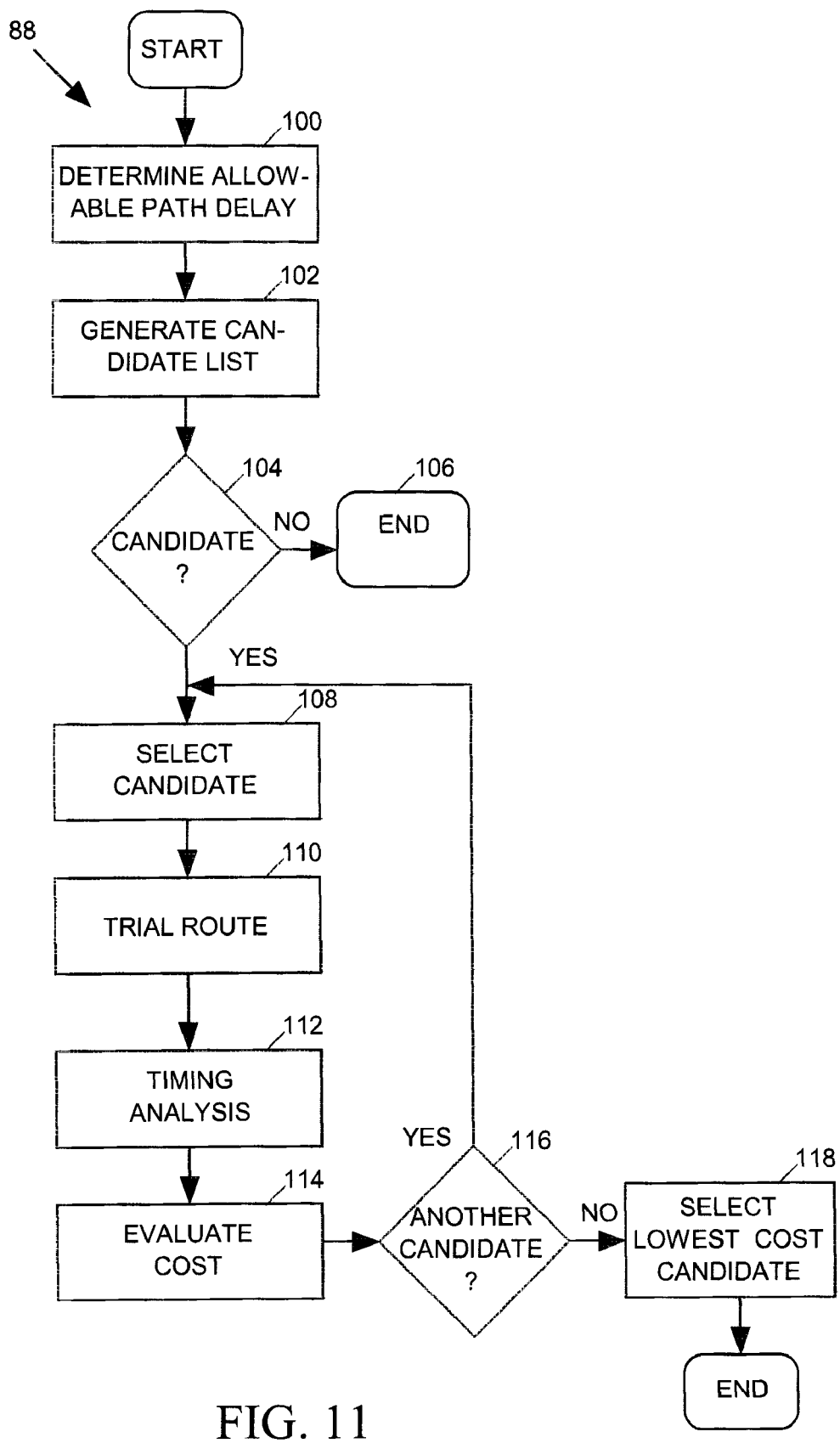
FIG. 11 is a process flow diagram depicting step 88 of FIG. 3 in more detail.

FIG. 11 depicts in more detail step 88 of FIG. 4 wherein ECO processor selects the best spare cell instance to implement an identified partition of the ECO graph. ECO processor 68 initially determines an allowable path delay for each net that is to be connected to the cell instance implementing the partition (step 100) and then generates a list of cell instances that are candidates for implementing the partition (step 102). A spare cell instance is considered a candidate for implementing a partition if it can be configured to implement the behavior indicated by the partition and if it is likely that path delays within the nets that are to be connected to it will be less that their allowable path delays.

Figure 12:
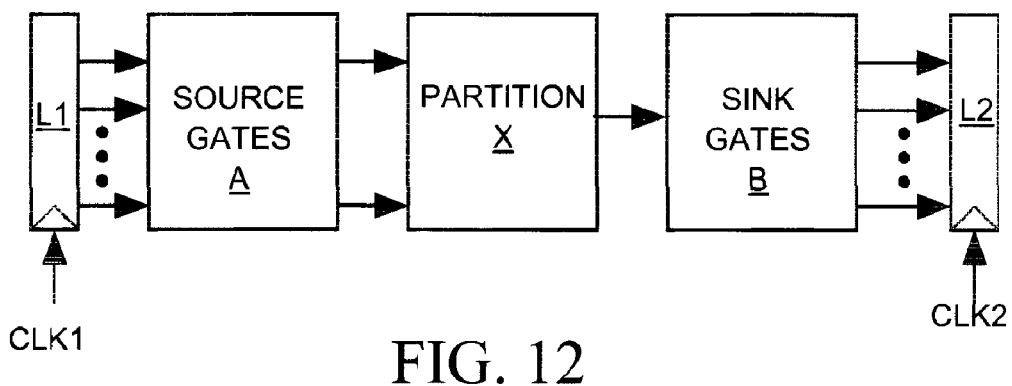
FIG. 12. Illustrates an example portion of an integrated circuit in combined block and schematic diagram form.
Figure 13:
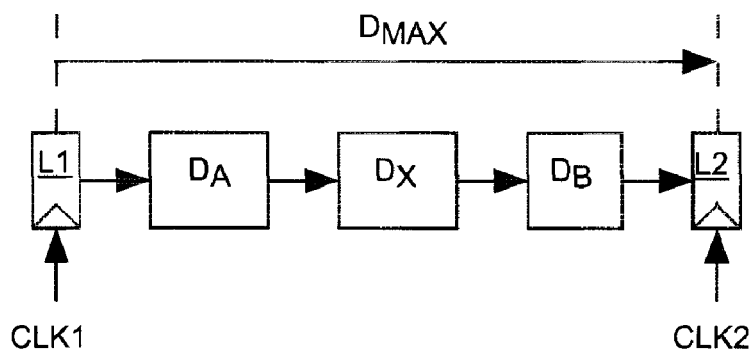
FIG. 13 is a block diagram illustrating signal path delays in the circuit of FIG. 12.

Referring to FIGS. 12 and 13, suppose ECO processor 68 is to select a cell instance to implement behavior of a partition X of FIG. 12 by receiving signals from a set of source gates A and sending signals to a set of sink gates B. At step 98, ECO processor 68 determines the maximum allowable path delay $D_X$ between the outputs of source gates and the inputs of sink gates B. A latch or other clocked device L1 of a synchronous IC synchronizes state changes in input signals to source gates A to a clock signal CLK1 while another clocked device L2 synchronizes state changes in the outputs of logic block 88 to edges of a clock signal CLK2. FIG. 13 is a block diagram showing path delays associated with the addition X of FIG. 14. When an edge of clock signal CLK1 clocks a state change in one of the logic block input signals, the effects of that state change must propagate to the output signals of sink gates B before the next edge of clock signal CLK2. Thus the maximum allowable signal propagation delay $D_{MAX}$ of partition X and the nets that connect it to source gates A and sink gates B is the time delay between edges of the CLK1 and CLK2 signals. Since the layouts for source gates A and sink gates B are known, ECO processor 68 uses conventional timing analysis techniques to estimate the signal propagation delays $D_A$ and $D_B$ through source gates A and sink gates B.

Given the estimated propagation delays $D_A$ and $D_B$ through the source and sink gates A and B, and the maximum allowable signal propagation delay $D_{MAX}$ through logic block 87, the maximum allowable delay $D_X$ through partition X is $$D_X = D_{MAX} - D_A - D_B.$$

The delay $D_X$ is a function of the switching delay of the spare cell instance that is to implement partition X and of the lengths of the signal propagation delay though the nets interconnecting that spare cell instance to source and sink gates A and B.

Thus when selecting a spare cell instance to implement partition X, ECO processor 68 initially limits its selection not only to those spare cell instances on the spare cell instance list that exhibit the proper logical behavior, but also to spare cell instances having a sufficiently short switching delay and which are sufficiently close to source and sink gate A and B to keep the propagation delay through the partition within maximum allowable delay $D_X$. Since the propagation delay of each spare cell instance is known, ECO processor 68 determines which spare cell instances capable of carrying out the appropriate logic are sufficiently close to the source and sinks gates and sufficiently short switching delay and adds those spare cell instances to the candidate list at step 102 of FIG. 11.

Figure 14:
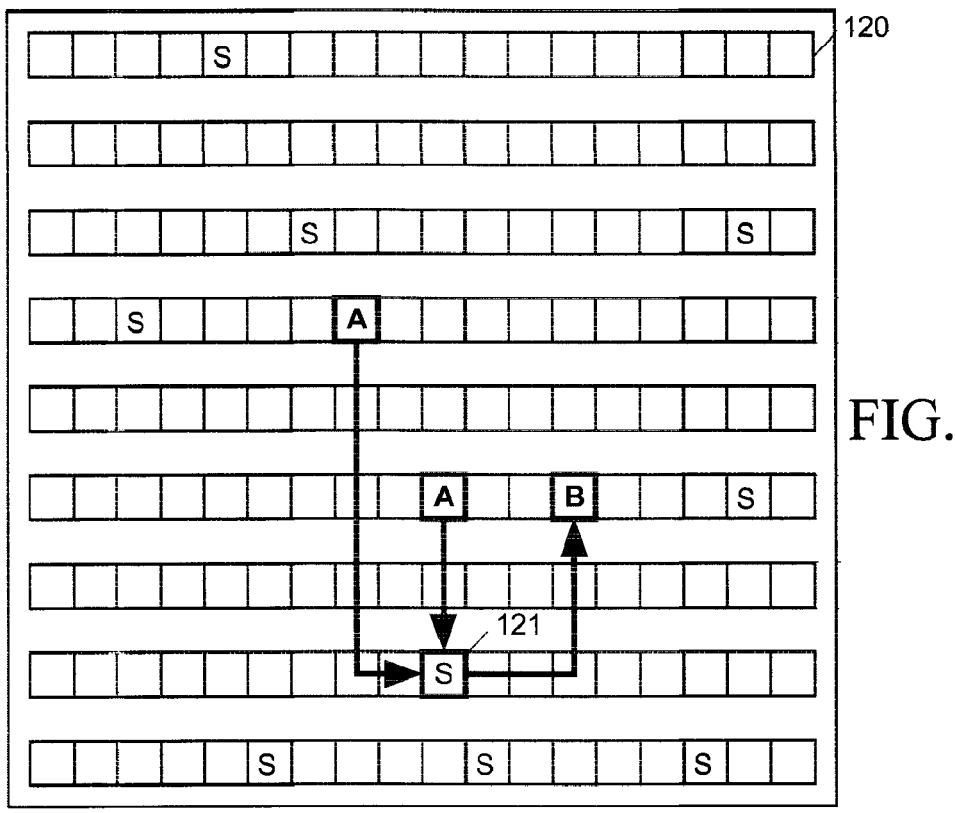
FIGS. 14 and 15 are simplified plan views of an integrated circuit layout.

FIG. 14 shows a simplified plan view of a portion of an IC layout in which cell instances 120 are arranged in rows. Assume source gates A and a sink gate B of FIG. 6 reside in the positions shown in FIG. 14 and there are several spare cell instances S capable of implementing the logic of partition X of FIG. 6. If ECO processor 68 is to insure that the propagation delay through partition X is to be less than $D_X$, it must select a spare cell instance S that is sufficiently close to cell instances A and B and has sufficiently short switching delay to adequately limit path delays in the nets that are to interconnect them. For example, suppose ECO processor 68 considers using a spare cell instance 121 to implement the addition. Since the nets that interconnect cell instances normally extend in orthogonal horizontal directions, the signal path distances from each cell instance A to spare cell instance 121 can be estimated as the sum of the distances between cell instance A and spare cell instance 121 in those two horizontal directions. The signal path distance from spare cell instance 121 to cell instance B is estimated in a similar manner. Given these estimated distances, and an estimated delay per unit distance, and the propagation delay through spare cell instance 121, ECO processor can estimate the delay through partition X if implemented by cell instance 121. If that delay is greater than $D_X$, then spare cell instance 121 could not implement partition X without violating the $D_X$ timing constraint. However if the estimated path delay is less than $D_X$, it is likely that spare cell instance 121 could implement partition X without violating the $D_X$ timing constraint.

Figure 15:
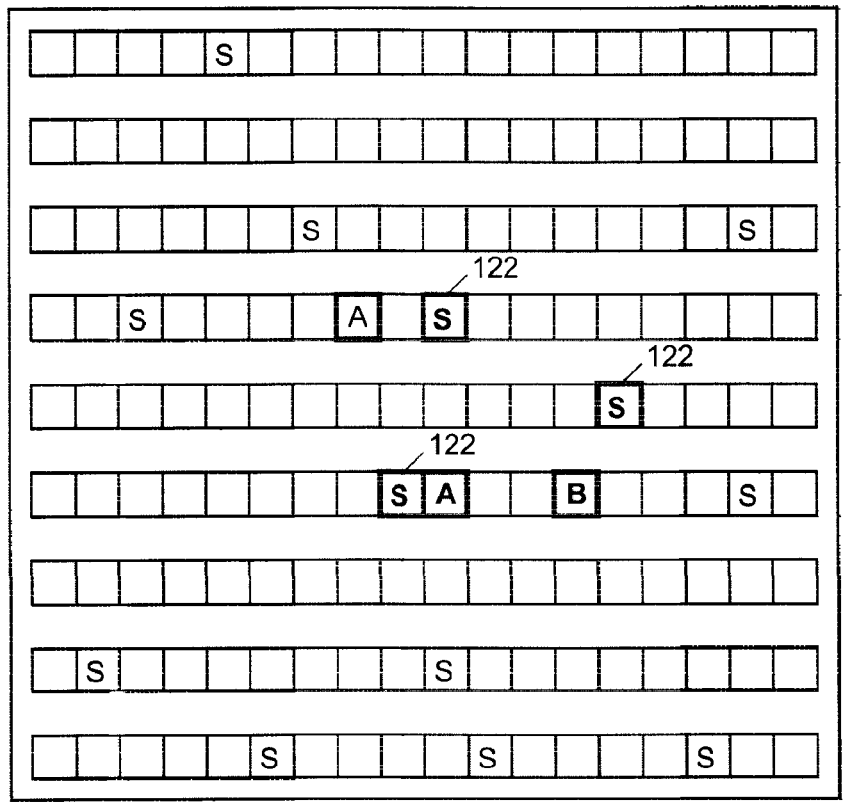

Thus based on the determined allowable path delay through a partition identified at step 86, on an estimated net path delay per unit, on the known switching delay of each spare cell instance, and on the known positions within the layout of the source and sink gates that produce the input signals to the identified partition, ECO processor 68 determines, as shown in FIG. 15 which spare cell instances 122 can be considered as candidates for implementing the identified partition and generates a list of candidate spare cell instances (step 102, FIG. 11).

Referring again to FIG. 11, if there are no candidate cell instances on the candidate list (step 104) the process terminates and that particular partition is no longer considered possible. If there is at least one candidate cell instance on the list, ECO processor 68 selects one of the candidate cell instances (step 108) and employs a conventional routing tool to trial route the nets interconnecting that cell instance to its source and sink gates (step 110). A routing tool can trial route nets quickly by assuming they terminate on cell instance centers rather than on the appropriate cell instance terminals, and by not trying to resolve routing conflicts between the nets and any other existing nets or any net design rule violations. The trial routing generated at step 110 nonetheless enables ECO processor 68 to estimate path delays through the partition (step 112) and to then estimate a "cost" of using that spare cell instance to implement that particular partition (step 114) by evaluating the cost function that is, for example, a weighted sum of the number of design rule violations, routing conflicts, routing congestion, and timing violations that would have to be resolved later when a detailed route is established for each net if the solution were to be implemented. The cost function may also include a term that increases with the number of layers that need to be modified to implement the trial routing, thereby to bias ECO processor 68 toward selecting partitions requiring changes to fewer layer masks.

After trial routing a candidate at step 110 and evaluating the path delay and routing costs associated with that solution at steps 112 and 114, ECO processor 68 looks for another candidate on the candidate list (step 116) and if there is another candidate, it selects one (step 108) and repeats steps 110-114 to evaluate the cost of using that candidate to implement the partition. ECO processor 68 continues to iterate through steps 108-114 to evaluate the cost of each candidate on the list. When there are no more candidates to evaluate (step 116), it selects the lowest cost candidate as the lowest cost implementation for that particular partition.

Figure 16:
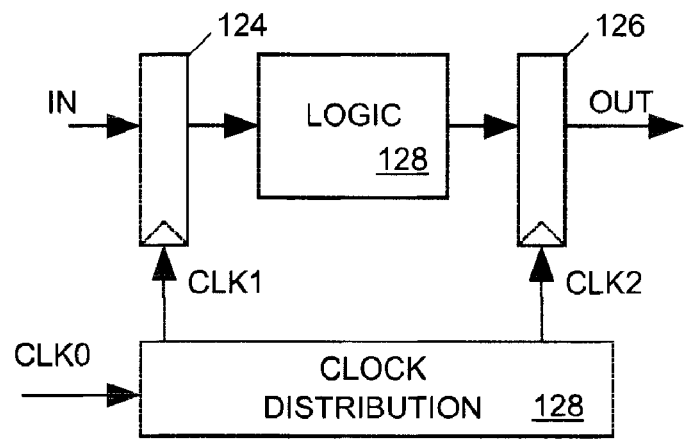
FIG. 16 illustrates an example portion of an integrated circuit in combined block and schematic diagram form.

Some partitions may form part of a clock signal distribution circuit. For example FIG. 16 shows an ECO partition having two registers 124 and 126 for clocking the input and output signals of a block of combinational logic 128 and clock distribution circuit 128 for converting an input clock signal CLK0 into two output clock signals CLK1 and CLK2 for clocking devices 124 and 126. In using spare cell instances to implement any portion of clock distribution circuit 128, ECO processor 68 must satisfy a timing constraint requiring that edges of clock signals CLK1 and CLK2 occur with specified timing relative to edges of clock signal CLK0. Clock distribution circuit 128, which may include gating logic and buffers, must correctly delay clock signals CLK1 and CLK2 so that timing of edges of CLK1 and CLK2 exhibits sufficiently small deviation ("skew") from the specified timing. Thus when an ECO graph partition identified at step 86 is a part of a clock distribution circuit, the timing analysis performed at step 112 of FIG. 11 will include estimating clock signal skew, and the routing cost function evaluated at step 114 will include a term that increases with the estimated skew, since having to reduce excessive clock signal skew increases the likelihood of a routing failure during the detailed routing process.

ECO Optimization

After ECO re-synthesis step 78 of FIG. 3, ECO processor 68 tries to eliminate any DRC or timing errors and to minimize mask changes by performing ECO optimization (step 80) using various well-known layout optimization techniques. Such optimization techniques may include, for example, instance swapping (replacing a cell instance with a spare in another location), gate duplication (adding a spare gate cell instance in parallel with a similar existing gate cell instance to increase driving power), buffer insertion (inserting a buffer cell instance into a net to reduce path delays), pin swapping (exchanging net terminations on cell instances such as AND, NAND, OR and NOR gates having symmetric inputs), redundant gate swapping (swapping net connections to two similar gates), and path-based re-synthesis (re-synthesizing the gates forming a particular signal path).

FIG. 20 shows an example circuit formed by a set of gate cell instances A-E and FIG. 21 shows the circuit after optimization in which a spare gate h replaces gate b and a pair of buffers I and J are inserted to reduce path delays. FIG. 22 shows an example circuit including a pair of gates A and B having outputs driving inputs of an AND gate C. FIG. 23 shows a result of an optimization process in which the outputs of gates A and B of FIG. 22 are swapped at the inputs of gate C. This does not alter the logic of the circuit but can be done during optimization step 86 in order to eliminate timing or other design rule violations.

Figure 24:
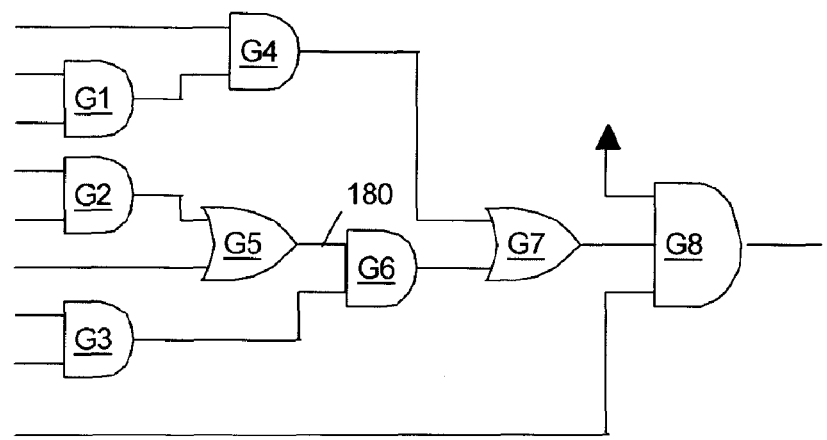
Figure 25:
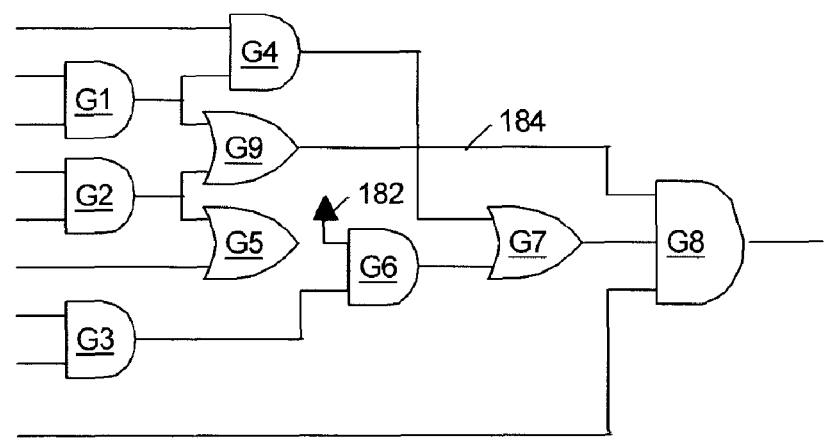

ECO optimization step 80 may also employ redundancy addition and removal (RAR) to resolve timing constraint violations and DRC errors and to minimize mask changes. By adding one or more spare cell instances and connections to a circuit, RAR can remove a wire without changing the function of the circuit. For example, FIG. 24 shows a circuit formed by a set of gate cell instances G1-G8 in which a net 180 connecting the output of gate cell instance G5 to an input of gate cell instance G6 is unroutable. RAR can eliminate the need for routing net 180 by connecting a spare gate cell instance G9 as shown in FIG. 25, extending nets 184 and 186 to the inputs of gate G9, routing a new net 188 from the output of gate G9 to a spare input of gate G8 and connecting the input of gate G6 to a logical "1" source. The circuits of FIGS. 24 and 25 carry out similar logic, but the RAR modifications to the circuit of FIG. 24 eliminate the need for the unroutable net 180 in the resulting circuit of FIG. 25.

ECO Routing

Referring again to FIG. 3, after having fully partitioned the ECO graph and selected a separate spare cell instance to implement each partition at ECO re-synthesis step 78, and having performed ECO optimization at step 80, ECO processor 68 carries out an "ECO routing" process (step 82). During step 82, ECO processor 68 disconnects nets from active cell instances forming deletions that are to be made spare and routes nets to spare cell instances that have been selected to implement the behavior specified by the ECO graph. An IC can have several metallic layers for implementing horizontal segments ("wires") of the nets interconnecting cell instances. An IC having, for example, nine metal layers M1-M9, with layer M1 being the lowest metal layer, would require nine masks for those metal layers. Nets also include conductive vias extending vertically between intervening insulating layers for interconnecting horizontal wires formed on separate metal layers.

Figure 26:
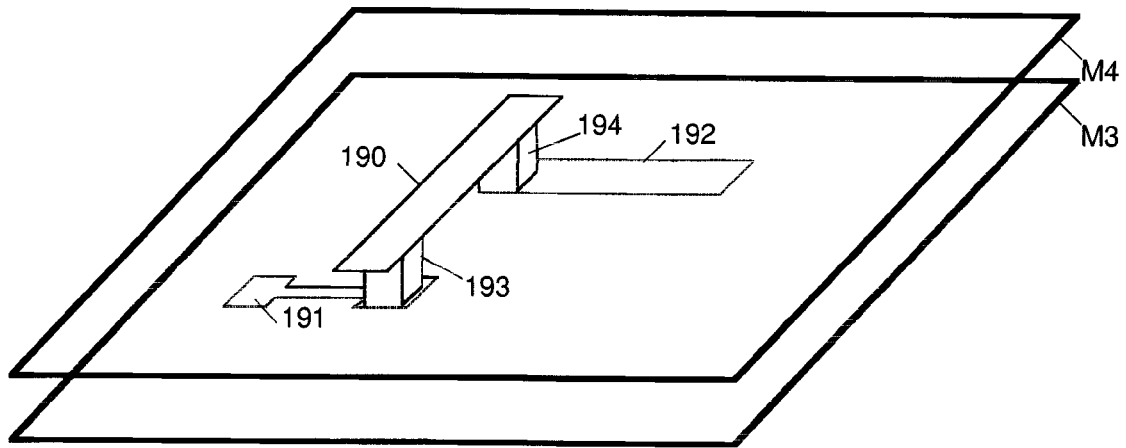
FIG. 26 is a simplified perspective view of a portion of a net residing on two metal layers.

When user input specifies that one or more of the metal layers are to be "frozen", ECO processor 68 tries to implement the change order without altering any frozen metal layer, if possible. During the routing process, when ECO processor 68 needs to disconnect cell instances interconnected by a net including a segment on a frozen metal layer, it will do so by removing only vias and/or segments of the net that reside on non-frozen layers, thereby allowing wires on the frozen layers to remain as "dangling" wires that are not part of any net. IC layouts often specify that one or more metal layers of an IC include "dummy metal", metal layer objects not used to form nets for propagating signals. Dangling wires resulting from engineering change orders are one type of dummy metal, but a dummy metal object can also be a design-for-manufacturing (DFM) metal filler that conveys no signal and has no effect on IC behavior but which is included in the IC, for example, to improve manufacturing yield. To implement a change order, ECO processor 68 may incorporate a dangling wire or other available dummy metal into newly added or modified net. For example, FIG. 26 is a simplified perspective view of objects on metal layers M3-M4 that form part of a net. If layer M4 was frozen, then after removing deletions, ECO processor 68 would leave a dummy metal wire 190 dangling on layer M4. When subsequently routing nets to accommodate additions, ECO processor 68 can, for example incorporate wire 190 into a net interconnecting wires 191 and 192 on layer M3 without affecting layer M4 by adding vias 193 and 194, provided that the enclosure for the vias reside completely within the wire 190 on the frozen layer M4 to avoid altering that layer. Since the mask for lowest metal layer M1 is usually the most expensive, ECO processor 68 initially automatically freezes layer M1 if the user has not already done so.

Figures 17, 18:
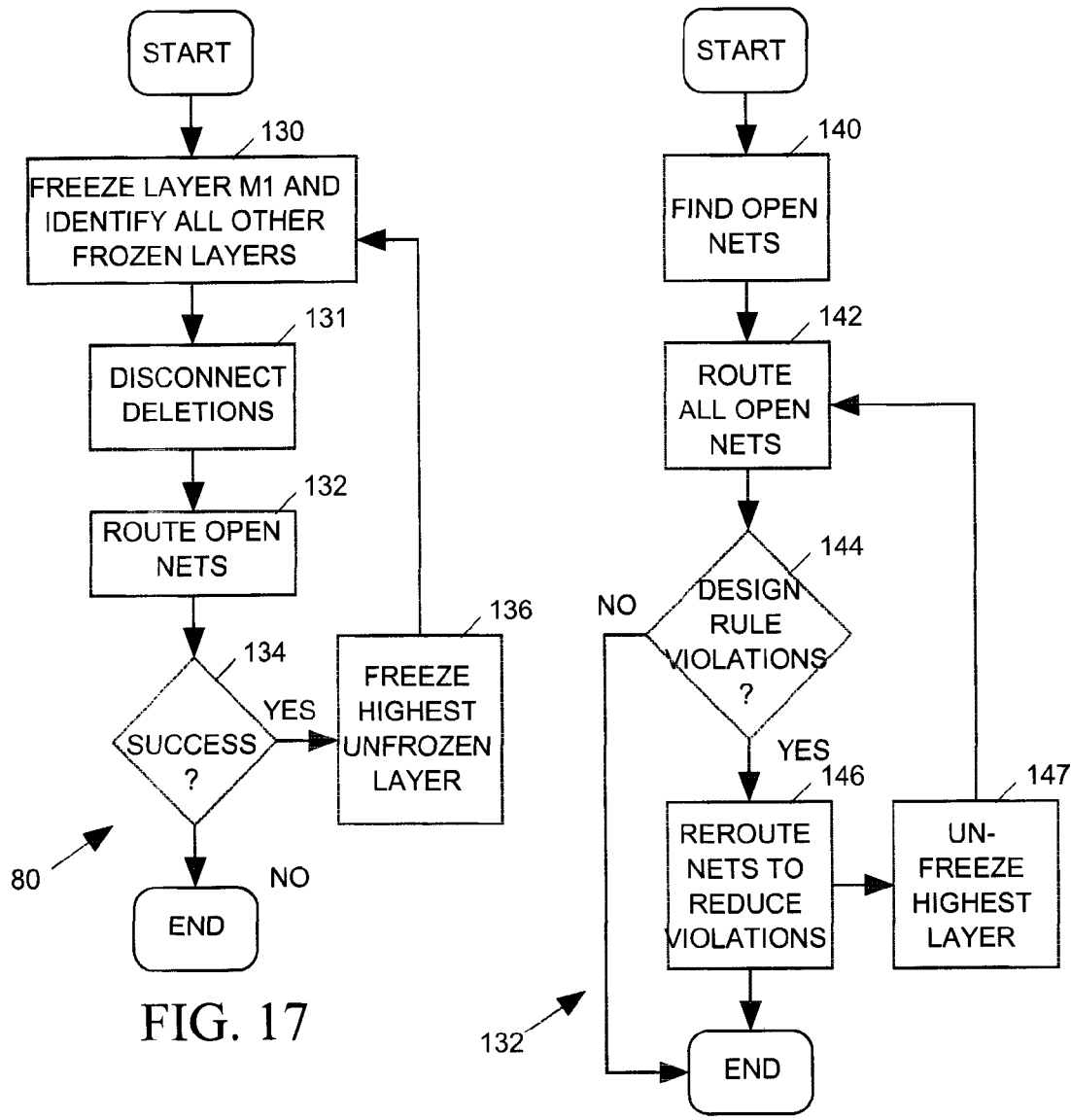
FIG. 17 is a process flow diagram illustrating the routing step 82 of FIG. 3 in more detail.
FIG. 18 is a process flow diagram illustrating step 132 of FIG. 3 in more detail.

FIG. 17 shows the routing step 82 of FIG. 3 in more detail. Starting at step 130, ECO processor 68 freezes layer M1 and also identifies all other frozen layers based on user input. ECO processor 68 then disconnects cell instances included in deletions by deleting vias and wire segments forming the nets connected to those cell instances, other than wire segments residing on frozen layers (step 131). As described in more detail below, ECO processor 68 then routes all nets that are not yet fully routed ("open nets") to interconnect the spare cell instances that were selected to implement the circuit behavior specified ECO graph (step 132). ECO processor 68 attempts to route the open nets without changing any frozen metal layer, but when it is not possible to do so, it will unfreeze a meal layer and redo ECO routing. If ECO processor 68 is able to successfully route the new nets (step 134), it will freeze the topmost unfrozen metal layer (step 136) and return to step 130 and completely repeat the routing process with that additional layer frozen. If it can successfully route all open nets with the additional layer frozen, it will save the cost of re-fabricating the mask for the top-most metal layer. If it is able to successfully route all open nets with the topmost metal layer frozen (step 134), ECO processor 68 will freeze the next highest unfrozen layer and try routing the new nets again. ECO processor 68 will continue to loop through steps 130-136, attempting to route with progressively more metal layers frozen, until at step 134 it determines that it can no longer successfully route the new nets. At that point the ECO routing process (step 82) of FIG. 3 is complete, and the ECO processor 68 produces the ECO IC layout 70 using the routing plan that affected the fewest number of metal layers.

FIG. 18 depicts routing step 132 of FIG. 17 in more detail. To route all open nets, ECO processor 68 initially carries out a connectivity analysis to find all open nets (step 140) and then successively routes each open net (step 142). As it routes each net, ECO processor 168 will refrain from adding wires to any frozen metal layer, though it may incorporate dangling wires or other dummy metal residing on a frozen layer into a new net provided that any new vias connected to such dummy metal reside within the dummy metal's boundaries so that the metal layer need not be altered. After routing all nets, ECO processor 68 then checks the layout for design rule violations (step 144) and, if violations are found, rips up and reroutes existing nets when possible to reduce any violations (step 146). During the rip-up and rerouting process (step 146) ECO processor 68 avoids altering any frozen layer. However if it is unable to resolve violations, it may unfreeze the highest unfrozen layer, if any) (step 147) and return to step 131 to re-disconnect deletions and reroute the open nets with that layer unfrozen.

Figure 19:
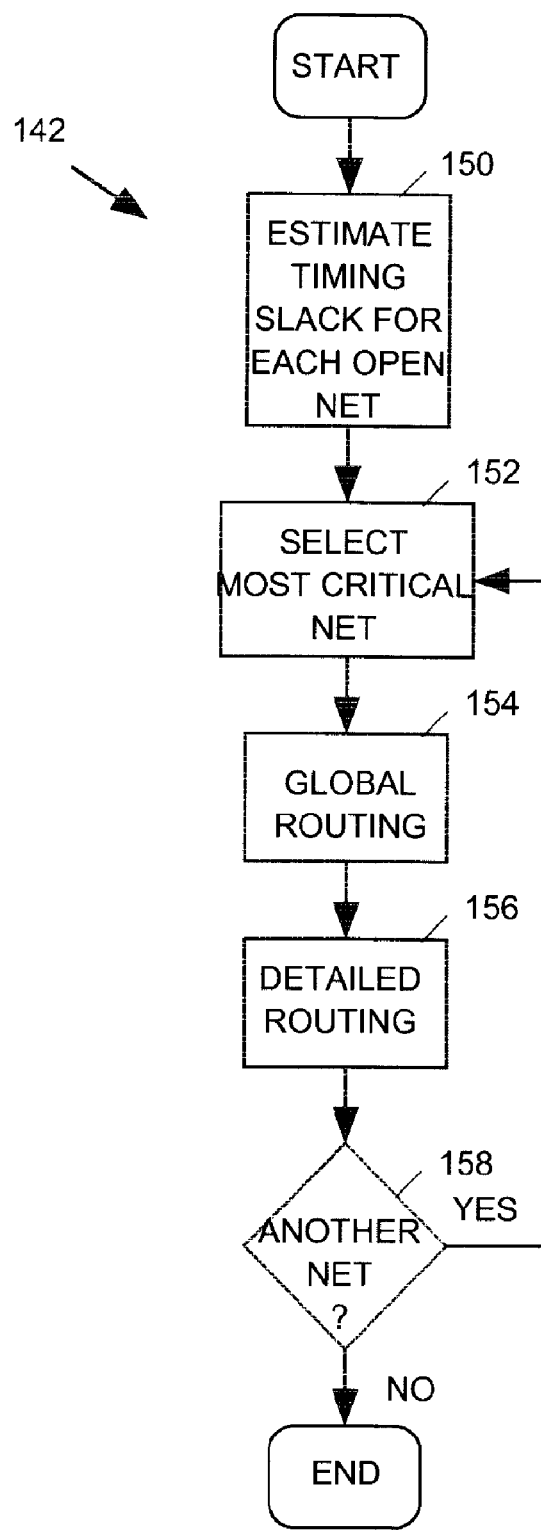
FIG. 19 is a process flow diagram illustrating step 142 of FIG. 3 in more detail.

FIG. 19 depicts step 142 of FIG. 18 in more detail. Before routing any open nets, ECO processor 68 employs conventional timing analysis techniques to estimate the timing slack for each net. The timing slack is the maximum allowable path delay in though net less an estimated actual path delay in the net based on a trial routing of the net and an estimated path delay per unit distance. ECO processor 68 then picks the most critical net (the net having the least timing slack), globally routes that net (step 152), finds a best global route for the selected net (step 154), and then performs detailed routing for that net (step 156) in a way that tries to minimize the number of design rule violations. If there is another open net (step 158), ECO processor 68 again selects the most critical open net (step 152, and repeats steps 154 and 156 to route that net. ECO processor 68 continues to loop through steps 152 through 158 until it has found a route for each net.

The ECO routing step 82 may return to ECO optimization step 80 to alter the selection of spare cell instances implementing graph partitions, or to ECO re-synthesis step 78 to alter the ECO graph partitioning when ECO processor 68 is unable to successfully route the modified layout.

Routing Only ECO

Figure 27:
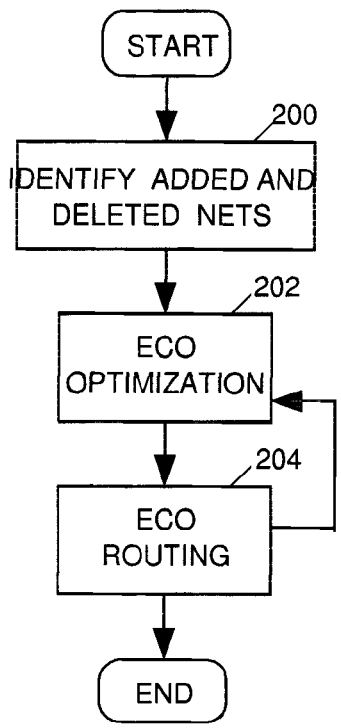
FIG. 27 is a process flow diagram depicting a process carried out by the engineering change order processor of FIG. 2 when the engineering change order specifies only routing changes.

Referring to FIG. 2, sometimes a designer may specify an ECO by directly modifying the initial IC layout 62 only by adding and/or deleting nets, without adding or deleting any active cell instances, to produce a modified IC layout 67. In such case, ECO processor 68 implements the process depicted in FIG. 27 in lieu of the process depicted in FIG. 3. ECO processor 68 compares the initial IC layout 62 to the modified IC layout 67 to identify the nets that the designer has added to and deleted from the initial IC layout 62 to produce the modified IC layout 67 (step 200). Since only routing changes have been made, it is not necessary for ECO processor 68 to carry out ECO re-synthesis. ECO processor 68 therefore immediately performs ECO optimization (step 202) as discussed above as necessary to eliminate any design rule or timing violations in the modified IC layout 67, and then carries out ECO routing (step 204) as necessary to accommodate any changes made during ECO optimization step 202.

Figure 28:
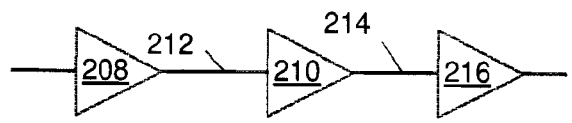
FIG. 28-30 are schematic diagrams respectively depicting a circuit before an ECO, as specified by an ECO, and following optimization.
Figure 29:
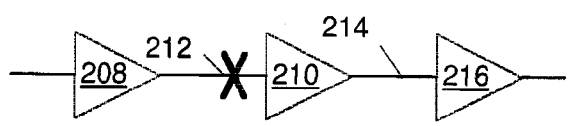

The modified IC layout 67 may specify that a particular connection between cell instances is to be broken. As discussed above, this can be done by deleting conductors forming that net that reside on unfrozen layers. Thus when a particular net providing a connection that is to be broken includes at least one conductor formed on any unfrozen layer, ECO processor 68 breaks that particular connection by deleting from the IC layout at least one conductor formed on any unfrozen layer at step 204, but refrains from deleting from the IC layout any conductor included in the particular net that is formed on any frozen layer. For example, as depicted in FIG. 28, the initial IC layout 62 may include a net 212 providing a connection between the output of a cell instance 208 and the input of another cell instance 210. As depicted in FIG. 29, the modified IC layout 67 may indicate that the connection is to be broken by indicting that net 212 is to be removed. If all of the conductors forming net 212 reside on unfrozen layers, ECO processor 68 allows the net to be removed in its entirety. If at least one conductor forming net 212 resides on an unfrozen layer, and at least one other conductor forming net 212 resides on a frozen layer, then the connection provided by net 212 can be broken by removing only the conductors residing on unfrozen layers. In such case, ECO processor 68 restores any conductors that reside on frozen layers during ECO routing step 204 so that the frozen layers are not modified.

Figure 30:
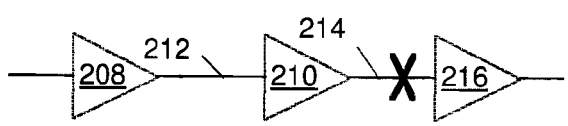

On the other hand, when ECO processor 68 determines that the particular net 212 includes only a single conductor formed on a frozen layer, it may not be possible to break the connection it provides between cell instances 208 and 210 without modifying the frozen layer. In that case ECO processor 68 determines, during ECO optimization step 202, whether breaking a connection provided by another net which includes at least one conductor formed on an unfrozen layer would have the same effect on logical behavior of the IC as breaking the particular connection provided by net 212. For example, note that net 212 provides a single input to a buffer gate 210 and that the output of buffer gate 210 provides an input to another buffer gate 216. Breaking the connection provided by net 212 at the input of gate 210 as illustrated in FIG. 29 would have the same effect on circuit logic as breaking a net 214 at the input of gate 216 as illustrated in FIG. 30. If net 214 includes at least one conductor formed on an unfrozen layer, ECO processor 68 can delete that conductor to break the connection provided by net 214 in lieu of deleting any conductor forming net 212. Thus upon identifying net 214 as providing a connection that can be broken in lieu of breaking the connection provided by net 212, ECO processor 68 deletes any conductor included in net 214 that is formed on any unfrozen layer, while refraining from deleting from the IC layout any conductor included in net 214 residing on any frozen layer.

More generally, when an ECO indicates that all input connections to a cell instance such as, for example, an OR gate or an AND gate are to be broken, ECO processor 68 may alternatively break the connection at that cell instance's output during ECO optimization step 202 if necessary to avoid altering a frozen layer, provided that doing so is logically equivalent to breaking the cell instance's input connections.

Thus has been shown and described a method for implementing a post silicon engineering change order in a way that can minimize the number of layer masks that need to be changed. The method allows a designer to specify the change order by modifying either the RTL or gate level netlist without having to be concerned with the availability or positions within the IC of spare cell instances that can be used to implement additions.

The invention claimed is:

1. Non-transitory computer-readable storage media containing software, which when read and executed by a computer, causes the computer to carry out a method for implementing an engineering change order (ECO) by modifying a first integrated circuit (IC) layout for a first IC to produce a second IC layout for a second IC, wherein the first and second ICs include active cell instances interconnected by nets to form subcircuits, and include spare cell instances not interconnected by nets, the method comprising the steps of:
   a. comparing netlists describing the first and second ICs to identify additions and deletions, wherein additions are subcircuits formed by active cell instances and nets included in the second IC but not in the first IC, and wherein deletions are subcircuits formed by active cell instances and nets included in the first IC but not included in the second IC;
   b. reclassifying active cell instances of the first IC that form the identified deletions as spare cell instances of the first IC; and
   c. performing ECO re-synthesis comprising generating a technology independent model depicting circuit behavior of the identified additions and selecting spare cell instances of the first IC to implement the circuit behavior depicted by the technology independent model,
   and wherein step c comprises the substeps of:
   c1. identifying partitions of the technology independent model, each of which specifies circuit behavior that can be implemented by any spare cell instance of the first IC not already committed to implementing circuit behavior specified by any other partition of the technology independent model;
   c2. selecting a partition from among all partitions identified at step c1 that specifies circuit behavior that a spare cell instance of the first IC can implement at a lowest cost as determined by a cost function, and committing that spare cell instance to implement the selected partition in the second IC;
   c3. modifying the technology independent model to delete the partition selected at step c2; and
   c4. repeating substeps c1, c2 and c3 until all portions of the technology independent model have been deleted.

2. The computer-readable media in accordance with claim 1 wherein the method further comprises the step of
   d. following step c, performing ECO optimization by altering the selection of spare cell instances of the first IC to implement the depicted circuit behavior to improve routeabilty of nets that are to interconnect the selected spare cell instances.

3. The computer-readable media in accordance with claim 2 wherein the method further comprises the step of:
   e. performing ECO routing comprising modifying the net routing specified by the first IC layout to route nets to the spare cell instances selected at steps c and d so that the selected spare cell instances implement the circuit behavior depicted by the technology independent model.

4. The computer-readable media in accordance with claim 3 wherein ECO routing performed at step e further comprises modifying the net routing specified by the first IC layout to delete portions of nets routed to cell instances forming the deletions identified at step a to convert them into spare cell instances.

5. The computer-readable media in accordance with claim 4 wherein the method further comprises the step of
   f. repeating steps d and e to eliminate at least one timing violation, design rule violation or routing conflict.

6. The computer-readable media in accordance with claim 1 wherein, for each particular partition identified at substep c1, substep c2 comprises the substeps of:
   c21. estimating an allowable path delay for each particular net that must be routed to any spare cell instance of the first IC if that spare cell instance is to be committed to implementing the particular partition within the second IC;
   c22. identifying every spare cell instance of the first IC not yet committed to implementing any partition of the technology independent model that can implement the particular partition and that is positioned within the first IC such that an actual path delay of each particular net would be less than allowable path delay estimated at step c21; and
   c23. determining which spare cell instance identified at step c2 results in a lowest routability cost for the particular partition if that spare cell instance is committed to implementing the particular partition within the second IC.

7. The computer-readable media in accordance with claim 6 wherein the cost function is a function of at least one of an estimated number of design rule violations, an estimated number of routing conflicts, and an estimated number of timing violations caused by the particular nets.

8. The computer-readable media in accordance with claim 6 wherein the cost function is a weighted sum of variables comprising an estimated number of design rule violations, routing conflicts, and timing violations that will arise when routing the particular nets at step e.

9. The computer-readable media in accordance with claim 3,
   wherein nets of the first and second ICs comprise wires residing on a plurality of routing layers of the first and second ICs and vias interconnecting wires on separate ones of the routing layers,
   wherein at least one routing layer of the first IC is classified as a frozen layer that cannot be modified when modifying net routing during step e, and all other routing layers are classified as unfrozen layers that can be modified when modifying net routing during step e, and
   wherein at step e only unfrozen layers of the first IC layout are modified.

10. The computer-readable media in accordance with claim 6 wherein the cost function is a weighted sum of variables including an estimated number of frozen layers that would be modified when routing the particular nets at step e.

11. The computer-readable media in accordance with claim 9 further comprising the step of:
   f. following step e, freezing one of the unfrozen layers and then repeating step e.

12. The computer-readable media in accordance with claim 9 wherein step e comprises the substeps of:
   e1. identifying all nets that must be routed to the selected spare cell instances,
   e2. modify the net routing specified by the first IC layout to route every net identified at substep e1,
   e3. checking the first IC layout to determine whether any nets routed at substep e2 have design rule and timing constraint violations, and
   e4. further modifying the net routing specified by the first IC layout to route nets routed at step e2 to eliminate at least one design rule or timing constraint violation.

13. The computer-readable media in accordance with claim 12 wherein step e2 comprises the substeps of:
   e21. estimating a timing slack for each net identified at step e1; and
   e22. modifying the net routing specified by the first IC layout to successively route each net identified at step e1 in an increasing order of timing slack identified at substep e21.

14. Non-transitory computer readable storage media containing software, which when read and executed by a computer, causes the computer to carry out a method for implementing an engineering change order (ECO) for modifying an initial integrated circuit (IC) layout for guiding fabrication of an IC to produce a modified IC layout,
   wherein the initial IC layout describes the IC as comprising a plurality of cell instances and a plurality of nets for providing connections for conveying signals between the cell instances,
   wherein the initial IC layout describes the nets as including conductors formed on a plurality of metal layers of the IC,
   wherein at least one of the metal layers is designated as a frozen layer that is to remain unchanged in the modified IC layout, and all others of the metal layers are designated as unfrozen layers that may be changed in the modified IC layout,
   wherein the ECO indicates that at least one particular connection between cell instances provided by at least one particular net of the plurality of nets is to be broken, and
   wherein each particular connection cannot be broken without modifying a frozen layer,
   the method comprising the steps of:
   a. identifying at least one other connection between cell instances provided by at least one other net of the plurality of nets which, when broken, would have a same effect on behavior of the IC as breaking said at least one particular connection, and which can be broken by deleting a portion of each other net from the IC layout without modifying any frozen layer, and
   b. deleting from the initial IC layout said portion of each other net while refraining from modifying any frozen layer.

15. The computer-readable media in accordance with claim 14,
   wherein the at least one particular connection comprises a sole input connection to one of the cell instances; and
   wherein the at least one other connection comprises a sole output connection to said one of the cell instances.

16. The computer-readable media in accordance with claim 14,
   wherein the at least one particular connection comprises all input connections to one of the cell instances; and
   wherein the at least one other connection comprises all output connections to said one of the cell instances.

* * * * *